United States Patent [19]
Riddle

[11] Patent Number: 5,920,732
[45] Date of Patent: Jul. 6, 1999

[54] SYSTEM FOR PREALLOCATING ADDITIONAL LARGER BUFFER SIZES IN ACCORDANCE WITH PACKET SIZES OF DISCARDED PACKETS THAT CAN'T BE STORED IN EXISTING PREALLOCATED BUFFER SIZES

[75] Inventor: Guy G. Riddle, Los Gatos, Calif.

[73] Assignee: Apple Computer, Inc., Cupertino, Calif.

[21] Appl. No.: 08/674,136

[22] Filed: Jul. 1, 1996

[51] Int. Cl.[6] ...................................................... G06F 13/00

[52] U.S. Cl. ........................... 395/876; 395/873; 395/872

[58] Field of Search .................................... 395/876, 825, 395/848, 200.42, 873, 872

[56] References Cited

U.S. PATENT DOCUMENTS

| | | | |
|---|---|---|---|
| 5,136,692 | 8/1992 | Barrett et al. | 395/825 |
| 5,247,626 | 9/1993 | Firoozmand | 395/200.42 |
| 5,289,470 | 2/1994 | Chang et al. | 379/89 |
| 5,367,637 | 11/1994 | Wei | 395/876 |
| 5,530,902 | 6/1996 | McRoberts et al. | 395/848 |

*Primary Examiner*—Le Hien Luu
*Attorney, Agent, or Firm*—Blakely, Sokoloff, Taylor & Zafman

[57] ABSTRACT

A method at the receiver of a communication medium which receives communication packages and performs buffer size allocations. The method heuristically determines, based on measurements taken directly from the communication medium an appropriate buffer size sufficient to store incoming data packets without wasting memory at the receiver.

10 Claims, 8 Drawing Sheets

SYSTEM FOR PREALLOCATING ADDITIONAL LARGER BUFFER SIZES IN ACCORDANCE WITH PACKET SIZES OF DISCARDED PACKETS THAT CAN'T BE STORED IN EXISTING PREALLOCATED BUFFER SIZES

BACKGROUND

Teleconferencing applications are increasingly popular, as business, industry, and even social groups discover that the advantages of a face to face meeting can be achieved from the convenience of remote locations. Accordingly, developers of computer software and hardware have tried to adapt modern technologies to the needs of teleconferencing with various degrees of limited success. Like file transfer applications, teleconferencing applications use packet transfer protocols that group data into packets for transport from a sender to a receiver.

FIG. 1 shows a memory array within main memory 304 that may buffer I/O packets. The array is generally structured of addressable SRAMs, DRAMs, or other devices storing data in buffers of data cells, the cells being addressable by a memory bus master such as a processor or DMA device within the same computer system. Each cell has therein a plurality of bytes of memory. Buffers may comprise different numbers of cells and therefore may be of any length, and may be either contiguous cells of memory or linked cells of memory. The linked-cell variety of memory requires additional addressing to point from cell to cell, but perhaps allows greater use of isolated free memory locations.

However, teleconferencing has several special requirements due to the real-time nature of teleconferencing. For example, real-time teleconferencing communicates in packets of non-uniform size, arriving at unpredictable times and, when more than two parties are participating in a teleconference, from different sources, and having different priorities. The non-uniformity of packet size is a function of the variety of data required in a video conference. Teleconferencing may communicate compressed video images having a large packet of full frame video image, followed by a series of smaller size packets of difference video images, accompanied by packets of audio data. Also, because teleconferencing generally does not include acknowledgment signals and often operate on asynchronous networks, a receiver cannot control or predict when packets arrive. Therefore, even when the data received is bursty, the receiver must have capacity to store at least some of the data until the processor can provide the data to the teleconference application. Multi-party teleconferencing may also complicate matters, as different applications sending data to a given receiver may use different packet sizes and different compression techniques, producing different size packets and requiring added complexity to the transport layer protocol (and lower layer protocols as well), since different buffer sizes may be necessary to accommodate the varying packets. Furthermore, because most teleconferencing has audio/sound/voice components as well as video, and because loss of a sound packet may be more disruptive to a teleconference than the loss of a video frame, receivers attempting to handle a shortage of buffer space in memory when a packet arrives must recognize a priority indicator in the packet. Memory handling is further complicated by the requirement imposed by many teleconferencing applications that data corresponding to a particular teleconference be stored in adjacent memory locations.

Most transport layer protocols, therefore, are inadequate for the task of handling the sort of data that may be expected in teleconferencing. Some low-level (i.e., transport layer and lower) protocols such as TCP/IP and ASDP were designed for file-transfer applications that do not operate in real time. Also, many of these protocols require retransmission of packets in which errors are detected, bogging down the information rate at which a sender may put data onto the network or other communication medium. Such protocols are inappropriate in real time applications like teleconferencing, where the loss of a single data frame or packet is inconsequential but repeated requests for retransmission could be problematic.

Also, in a real-time application, in addition to discarding packets that have errors, the receiver must also discard packets that do not fit into the input buffer, making buffer size a particularly acute problem. Large buffers sufficient to accommodate arbitrary packets waste memory, while small buffers would involve the loss of a lot of the packets. The input buffer in a real-time system is not sized by a TCP or ASDP protocol and therefore has a maximum data length into which can fit the input buffer or buffers, creating a situation in which additional data received by the receiver is discarded. Even if a process could somehow determine and detect an "unacceptable" rejection rate and reallocate memory to create larger buffers, such a reallocation could not presently be accomplished while data is being received. In other words, when a transport layer process is storing data into buffers, those buffers are inaccessible to higher-level processes that might be attempting to reallocate memory. Therefore, any reallocation must be performed when no data is being received, precisely when it will not be apparent to the receiver how long the data packets are. Intelligent components at the receiver, such as a CPU or a distributed direct memory access unit, also have memory demands, making memory management at the receiver problematic.

FIG. 2 shows one example of networked systems, specifically showing two systems on such a network or communication medium. Processors 150C and 155C are each connected via a network adapter 160 and 165, respectively, to a network medium 170. The network medium 170 may be a digital bus, a video coaxial cable, a fiber optic cable, or other medium through which information may be transferred from one location to another. It will be understood upon reference to FIG. 2 that other arrangements are possible, that the network may include more than two computer systems, and that each of the processors 150C and 155C may be connected via other network adapters or other communication medium adapters to other network or communication media. Although reference is made to networks and network media, it will be apparent upon reference to the specification of the present invention that other communication media such as a telephone line or other link may be used. It will also be apparent that the two systems may be coupled through a modem connected to each communication system.

Each of the processors in the computer systems shown in FIG. 2 has a video monitor at 150D and 155D, a video input 150A and 155A, an audio input 150B and 155B, a keyboard input and a mouse, and possibly other peripheral input/output devices connected thereto. It will be understood that each computer system may also comprise multiple processors sharing a network adapter, forming a local network within the larger network shown in FIG. 2. Computer systems such as 150 and 155 may connect to a number of network media having differing types of media substrates, and further having different network protocols. Processor 150C and 155C each display images on the video monitor 150D and 155D, respectively, and receive inputs from other peripherals. Processors may also be running computer programs, including application programs and transport layer programs, that may call one another and serve one another, exchanging data, addresses, and control signals.

FIG. 3 shows the system components of a general computer system, having a number of component devices, coupled over a network to a second computer system. Computer systems, stand alone servers, work stations, and other machines may be connected to one another across networks. A network may be a local network connecting a few machines to one another or a much wider network connecting large numbers of different types of machines. Many networks, especially wide area networks, connect machines operating on different platforms with different operating systems and 5 different microprocessors, but provide consistent protocols to allow the machines to communicate. Various approaches to networking are known in the art, including distributed networks and centrally administrative networks.

As shown in FIG. 3, a processor 302 is connected via a system bus 301 to a main memory 304, a read only memory 306, and a mass storage device 307. The main memory may be a volatile memory array composed of dynamic random access memory. The read only memory 306 may be composed of a CD ROM, an initialization cache, erasable programmable read only memory, EEPROM, flash memory, or other read only memories. The mass storage device 307 may be configured as a disk drive writing to, and reading from, hard disks, floppy disks, or other storage devices. Processor 302 may also have a cache, either a write back or read through configuration, storing frequently used values in a static random access memory or other memory array, the cache in some configurations being coupled directly to main memory 304. Various other intelligent devices may be connected to the bus 301, including direct memory access devices.

Also shown in FIG. 3, various peripherals exchange information via bus 301 with the processor 302, main memory 304, read only memory 306, and mass storage device 307. These peripherals include a display 321, generally a video monitor or printer. A keyboard 322 is also coupled to the bus 301, permitting alphanumeric entry. A cursor control 323 coupled to the bus 301 may be configured as a mouse or track ball. A sound output device 324, also coupled to the bus 301, may be configured as a loud speaker or a number of loud speakers. A video input device 325 may be configured as a video camera, a scanner, a fax input, or similar device, and is coupled to the processor 302 via bus 301. A sound input device 326, also coupled to the bus, may be configured as a microphone or a sound synthesizer, or may be a telephone connector. 6. Finally, a communication device 327, also coupled to the bus 301, allows communication between any of the above devices and the network medium 170 via the network adapter 160. It will be recognized that communication device 327 could be a modem, an internet card, or any network interface device, including a token network interface device or other FDDI device. It will also be apparent upon reference to the specification herein described that the communication medium may be any communication link, such as a telephone line or other link, and that the system shown in FIG. 3 may be coupled through the communication device 327 that may be a modem to another system not shown in the figure. In some embodiments, the networking medium is a digital communication medium, allowing high speed digital communication between computer systems over the network.

Two possible approaches to solving this problem have presented their own difficulties. First, because video compression is often implemented by transmitting periodically a full video frame, and between full video frames by transmitting difference frames that are much smaller in size than the full video frames, receiver systems that allocate one large block of memory for input buffering are highly inefficient. If a single large memory buffer is used to store input signals, sufficiently large to store a full frame image, than a large part of the time the smaller frames will not fill the buffer and will therefore waste a lot of memory. Second, if a linked list of fixed size buffers is used, in which the input or receiver protocol finds and allocates memory as data packets are received, services running on the receiver system may be unable to find data. Such services often require, or have performance that is enhanced by, collocating data in adjacent memory locations. Using a linked list of fixed size memory buffers scattered throughout memory would be problematic to such systems. A third alternative in which a linked list is first generated and then copied into adjacent memory locations can be very time consuming for the receiver CPU and also may require large amounts of additional memory to accomplish the copying.

The Macintosh Real-time video, audio, and data teleconferencing stream does not provide TCP, ASDP, or other error correcting protocols. Such error-correcting protocols generally send the data in packets of near-uniform packet sizes appropriate to the transmission medium, and although many of these protocols can receive data in a small number of predetermined other packet sizes, cannot process data arriving in packets of arbitrary length. Also, TCP, ASDP, and other low level packeting protocols include error correction at the packet level involving repetition of packets upon detection of an error, using a wait-for-acknowledge "handshake" protocols that is especially problematic in busy networks. Therefore, a need has arisen for an approach to low level packet-handling suitable for real-time applications that does not require retransmission, accommodating a plurality of arbitrary real-time teleconferencing applications communicating in packets of non-uniform size, arriving at unpredictable times and from different sources, and having different priorities, and providing the needed adjacency of data in memory.

Also, given that many network systems like ethernet have maximum packet size requirements, the packet-handling protocol should include a repackaging scheme corresponding to a particular data network, that "adapts" to a network by learning from the structure of data packets what size packets may be expected in the immediate future. Both TCP and ADSP have flow control as a feature of the protocol and the acknowledgment message sent over the network by the receiver to the sender. The flow control limits the amount of data a sender can put on to the network, and is implemented as a "window" of data, and if a sender places on the network more data than can fit into the window, the receiver will not send a confirmatory acknowledgment but rather will require retransmission. Once the window established by the TCP or ASDP protocol at the receiver, the protocol can allocate a buffer of sufficient size to store the window of data upon reception. However, if the CPU load varies significantly, and therefore the CPU cannot process data in the buffer at the receiver sufficiently fast, the buffer or buffers at the receiver may fill and the protocol may not be able to receive more data, then therefore the communication network will slow down as flow control messages are communicated from the receiver back to the sender.

Therefore, it would be desirable to provide a protocol at the receiver of a network communication package that heuristically determines, based on measurements taken directly from the node an appropriate buffer size sufficient to store incoming data packets without wasting memory at the receiver.

SUMMARY OF THE DETAILED DESCRIPTION

The present invention includes embodiments that heuristically measure packet sizes arriving from a network, pre-allocate buffers appropriately sized to accommodate such packets, and provide the further feature of recalculating an appropriate buffer size at subsequent times such that an appropriate buffer is always available to a received packet. In many embodiments, the present invention also allocates a number of buffers in main memory that have contiguous real addresses, immune to reallocation by the virtual memory system, available to the I/O system.

The present invention also is useful in interrupt-driven input/output systems, wherein the receipt of a packet interrupts high level processes including high level memory management processes, and therefore is particularly useful for allocating memory to the input/output process despite the inability to use the high level memory allocation processes.

Normally, at interrupt time, the input/output system cannot request memory from a high level memory management process, because the input/output system is interrupt driven and the high level processes do not operate at interrupt time, that is, when the system is interrupted.

When the system is not interrupted, several embodiments of the present invention examine unsatisfied I/O memory requests that had resulted in discarding of data received from a network, and-based on these unsatisfied requests, pre-allocate additional buffers in memory sufficient to accommodate other packets that may be expected to arrive from the network in the future. The memory thus allocated may include buffers of a variety of sizes, but have, in most embodiments, contiguous real memory addresses.

One embodiment of the present invention also anticipates small increases in packet size allocating memory in blocks of 512 bytes each, the blocks being larger than necessary to accommodate the packets. The embodiment described below also periodically examines memory for buffer sizes that have not been requested sufficiently recently to justified continued allocation, and deallocates buffers of those sizes. The deallocated buffers may be reallocated by the I/O system, or may be made available to higher level memory management processes. One example of an allocation may be a large number of small buffers for handling sound packets, a large number of slightly larger frames for handling video difference images, and a few very large frames for handling full frame video. Such an allocation may be produced by the embodiment of the invention described below when the packets received represent compressed video teleconference messages.

DETAILED DESCRIPTION

Figure 1:
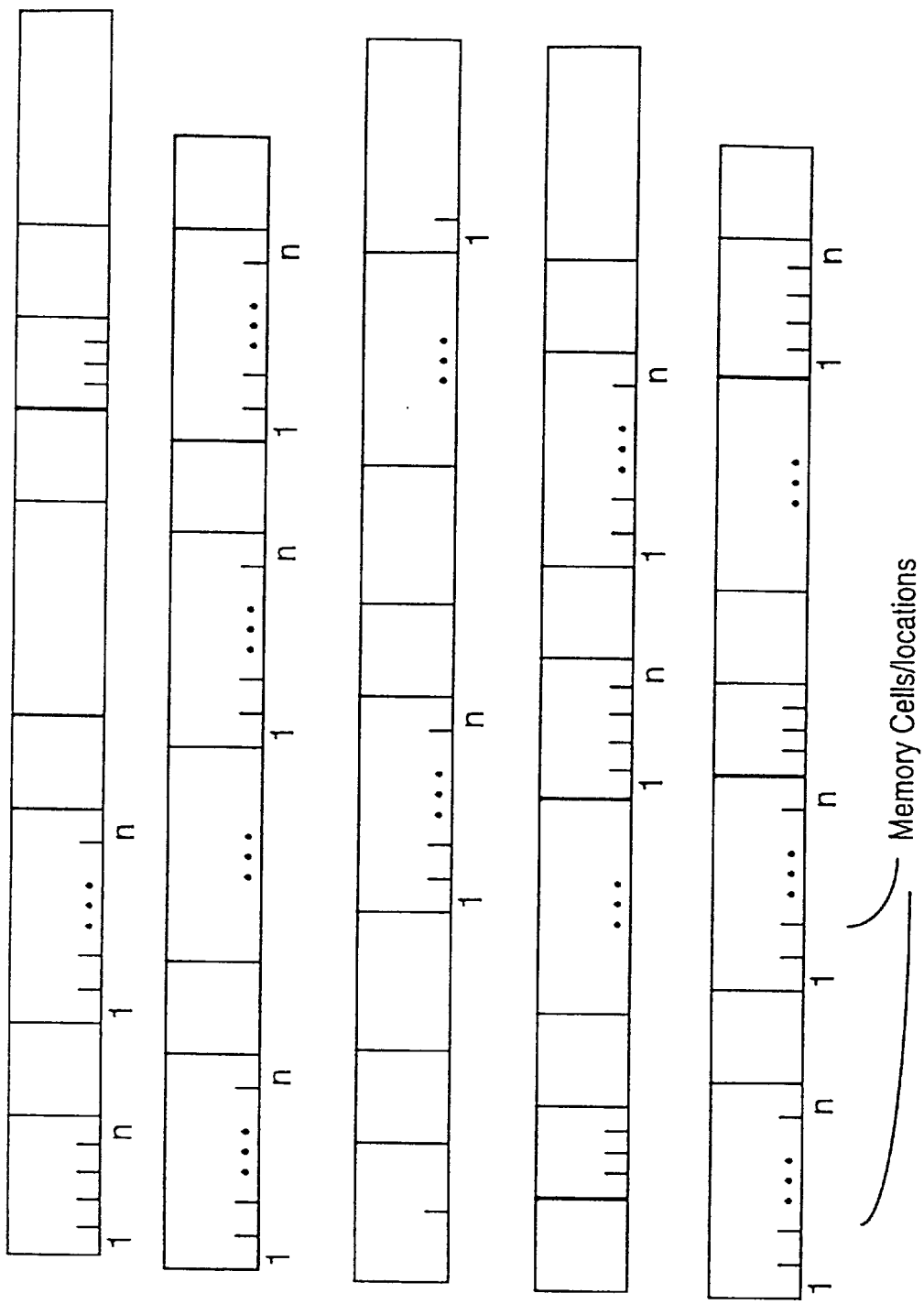
FIG. 1 shows an example of a memory array.
Figure 2:
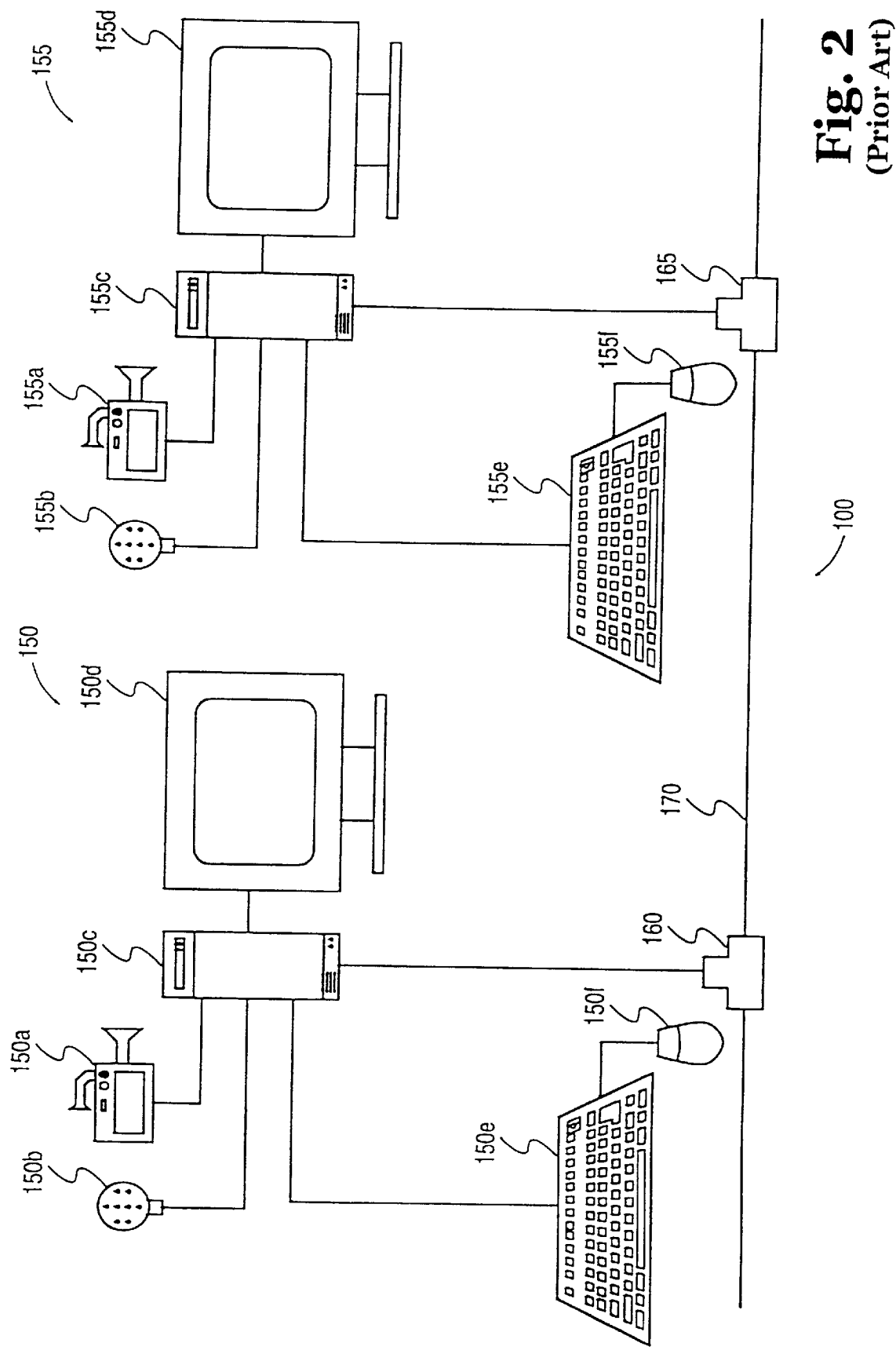
FIG. 2 shows an example of a networked system.
Figure 3:
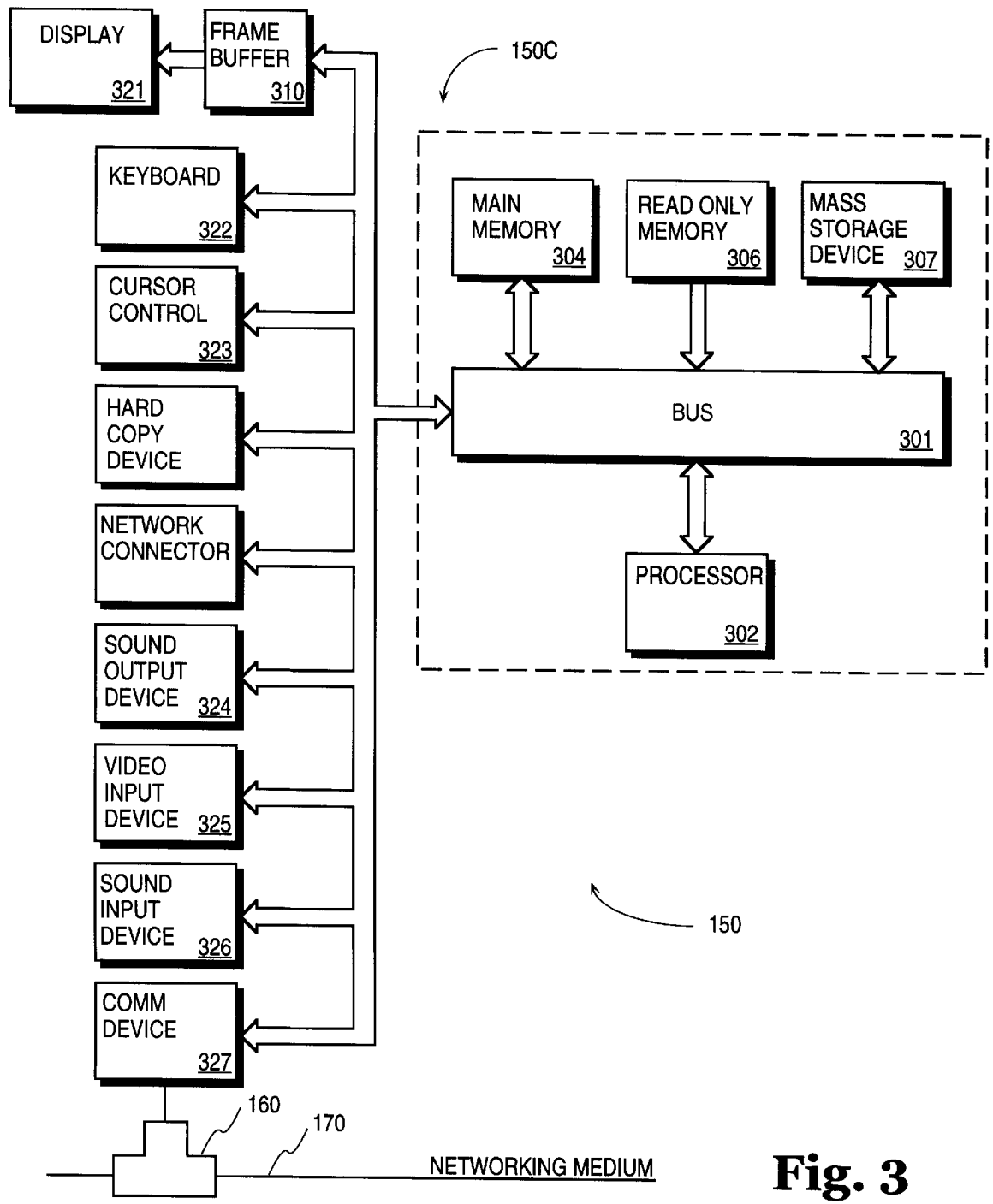
FIG. 3 shows an example of a number of system components within a system.

The described embodiment of the present invention is intended for use in an interrupt-driven I/O system, in which high level processes are interrupted and therefore unavailable upon the arrival of a packet at the receiver. Memory is therefore pre-allocated in pools of buffers among the various network applications by high-level processes like the Apple Memory Manager, and then used as buffers to accommodate the packets used by the application when data arrives. Additional memory is allocated to each buffer to accommodate media headers that are often received as part of incoming messages.

A routine BuffaloInit establishes an interrupt driven I/O packet handling routine. BuffaloInit calls Buffalo Start, which will be described below. Upon receipt of a packet of data, and in particular upon receiving data addressed to a teleconferencing application running on the same processor as a process according to the present invention, a call is made to BuffloOneChunk. BuffaloGetOneChunk, also shown in FIG. 4, handles interrupts upon receipt of a packet of teleconferencing data. BuffaloGetOneChunk calls BuffaloLasso and BuffaloCensus, which are described below. These routines allocate buffers in memory to store received data until the applications can process the data. GrowZoneProc is also included, to deallocate memory from input buffering when memory is running low in the main memory. Various other routines, such as BuffaloRoundup, Popqueue and Enqueue, BuffaloKill, BuffaloSlaughter, BuffaloRelease, and BuffaloIdle are also explained.

For example, an initialization feature may be implemented by the following code:

```
)(_BuffaloInit(
    GlobalsHandle           gh,
    long                    bonus
){
    GlobalsPtr          gp = *gh;
    ProcessStuffPtr     ps;
    ps = gp- process;
    if(ps->buffalo)
            gp->bonus = bonus - ps->bonus;
    else[
            if(!(ps->Buffalo= BuffaloStart (ps->bonus = bonus)));
                    return(MemError());
            if(!(ps->cabbage = OpenDefaultComponent
(kMTIdlerType, kMTMovieTalkSubType)) )
                    return(cantOpenHandler);
            MTIdlerGimmeTime (ps->cabbage, 16, BufloIdle,
(long) ps);
    ]
            return(noErr);
]
BuffaloStart(
    inf                     bonus
){
    BuffaloHeadPtr          bh;
            if(bh = (BuffaloHeadPtr) New PtrClear
(sizeof(BuffaloHead))){
                    bh->wantBuf = NewPtr(NUM_WANT_ENTRIES*
sizeof (WantEntry));
                    bh->wantPtr = (WantEntryPtr) bh- >wantBuf;
                    bh->bonus = bonus + sizeof (ChunkPrefix);
            }
            return(bh);
]
```

BuffaloStart merely initializes the memory management system. The processes of BuffaloLasso and BuffaloCensus reveal one advantage of the described embodiment of the present invention: the ability to fix buffer sizes dynamically, heuristically, as data is received. In one embodiment, buffer sizes are allocated in multiples of 512-byte blocks, although in other embodiments the block size can be an input variable or a multiple of an input variable, or a constant predetermined by a network manager. The number of blocks used for a particular buffer is determined by the size of data packets actually received, not by a predetermined number. Each buffer is assigned a number of blocks that is heuristically determined. If the block size is selected to large, then memory will be wasted; if the block size is too small, then some of the advantage of using the present invention may be lost. Therefore, an appropriate block size, as well as the number of blocks for each buffer, is selected heuristically depending on the sort of data expected.

BuffaloLasso determines a block size by rounding a packet size up to the next multiple of BLOCK_SIZE bytes, adding a bonus field sufficient to receive any media header attached to an incoming packet. Thus, the allocations determined in BuffaloInit are of quantized sizes, and are suitable for receiving packets within a range of packet sizes. In one embodiment, all allocations made by BuffaloInit have a uniform bonus length that is determined either as a constant or as an input variable, but does not vary from one allocation to another (i.e., one call to BuffaloInit to another).

When a packet arrives, high-level processes are interrupted and BuffaloGetOneChunk is called. BuffaloGetOneChunk calculates the "preferred" buffer size for the packet, the preferred size being the smallest number of blocks of the predetermined block size that, when increased by the "bonus" number of bytes accommodating any media header that might be included in the packet, can store the entire packet of data. Once the preferred size is determined, BuffaloGetOneChunk then calls BuffaloLasso, a routine that maintains a list of currently available buffer sizes. If the list includes the preferred size, BuffaloLasso allocates memory accordingly. BuffaloGetOneChunk may be implemented by the following code:

```
BuffaloGetOneChunk(
    GlobalsHandle      gh,
    long               size,
    short              please
){
    GlobalsPtr         gp = *gh:
    ProcessStuffPtr         ps;
    Ptr                p:
    ps = gp->process;
    size +=gp->bonus;
    p = BuffaloLasso(ps->buffalo, size, gp->self);
    if(p || !please)
        return(p);
    BuffaloCensus (ps->buffalo);
    return(BuffaloLasso (ps->buffalo, size, gp->self);
}
```

Figure 4:
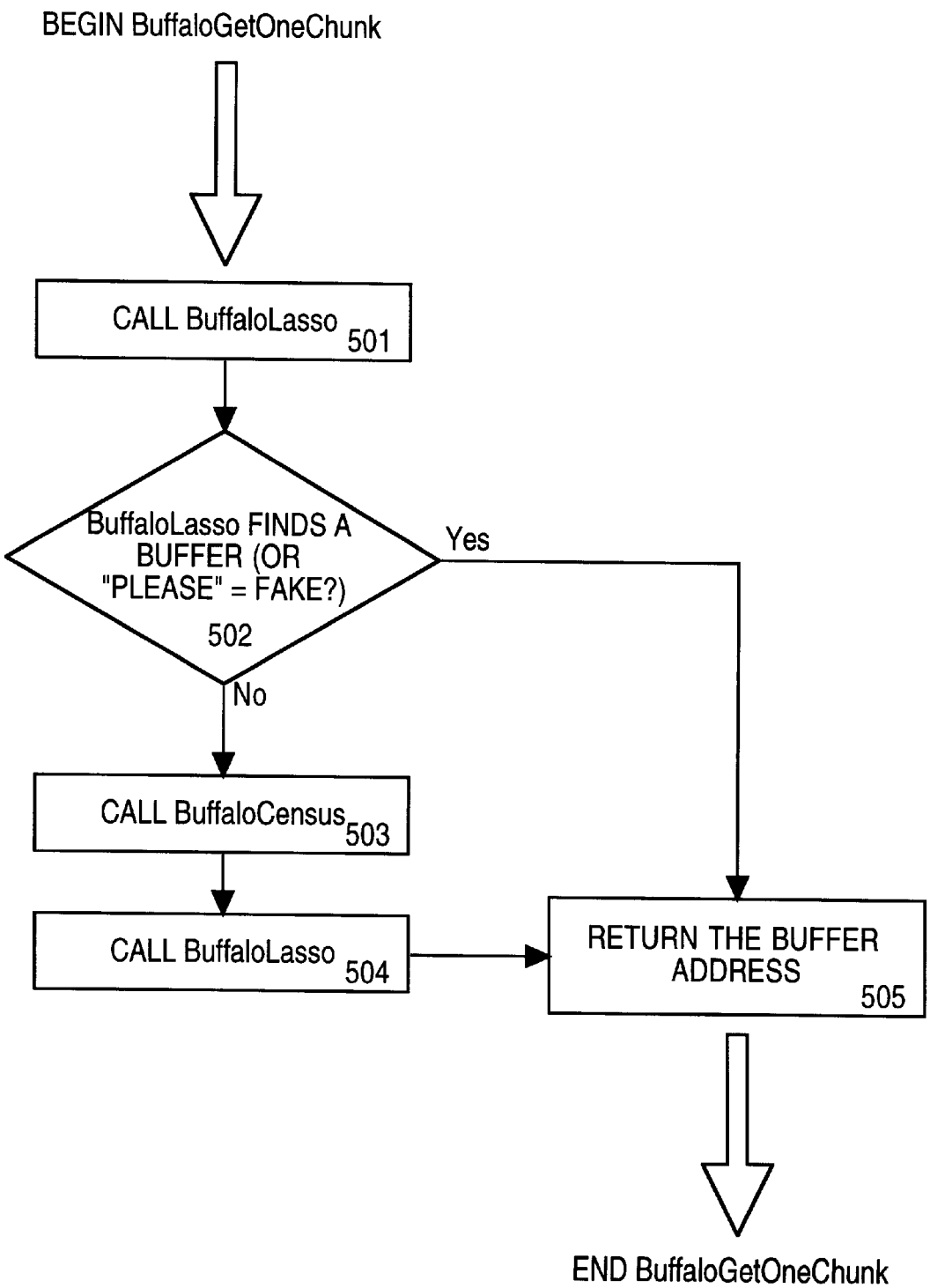
FIG. 4 shows a flowchart representation of the process GetOneChunk, according to one embodiment of the present invention.

BuffaloGetOneChunk is also shown in FIG. 4.

BuffaloGetOneChunk calls BuffaloLasso 501. Then, BuffaloLasso attempts to find a buffer 502. If successful, BuffaloGetOneChunk returns a pointer of the found buffer 505. If not successful, BuffaloGetOneChunk calls BuffaloCensus 503 and BuffaloLasso 504 to get a buffer. Then, BuffaloGetOnechunk returns the buffer address 505.

The implementation of BuffaloGetOneChunk includes a variable "please" that allows the process to be called by the higher level memory management process even when the system is not interrupted.

If an unused buffer of an appropriate size is available, the buffer is located and allocated by BuffaloLasso. As thus described, the buffer thus selected is slightly larger than an integer-multiple of the block size, the difference being the "bonus" size predetermined to be sufficient to hold the packet media header, but is the smallest buffer available that can store the newly-received packet. BuffaloLasso maintains a "Size List" of the memory addresses of buffers that have a length currently in use by the protocol, i.e. a length for which buffers have recently been allocated. BuffaloLasso calls BuffaloRoundup 702 to arrange a sizeList in order. BuffaloLasso then finds the smallest integer that, when multiplied by the value of BlockSize and increases by the Bonus, calculates a buffer size that is larger than the size of a newly received packet 704. In other words, in step 704, BuffaloLasso finds the smallest buffer size that could hold the newly-received packet. In step 706, BuffaloLasso begins looping through the sizeList, a linked list of entries containing several fields, including a number indicating a block size and a pointer to the next entry. The block sizes in the sizeList are the sizes for which buffers have been allocated; some of them may have data, while others may be empty, but the sizes are maintained in the sizeList. BuffaloLasso then iterates through the sizeList to find a buffer size therein that is the same size or slightly larger than the size necessary to hold the newly received packet. If 15 an entry in the sizeList is found, then BuffaloLasso returns a pointer 708. If no value is found, however, and the end of the sizeList is reached, then the size determined in step 704 (the minimum block size that will accommodate the newly received packet) is placed on the want list 712. The number of entries on the want list is incremented as well 713. Finally, BuffaloLasso determines some additional information for storage in the sizeList, indicating that another packet of a particular size has been received 714. One embodiment of BuffaloLasso may be implemented by the following code:

```
BuffaloLasso (
    BuffaloHeadPtr        bh,
    long       size,
({
    SizePlacePtr    sp;
    ChunkPrefixPtr         cp;
    int         blocks;
    Ptr         p;
        BuffaloRoundup (bh);
    blocks = (size- 1) / BLOCK_SIZE + 1;
    p = 0;
    for(sp = bh->sizeList; sp; sp = sp->next)
            if((blocks <= sp->blocks) && (p = Popqueue(&sp->freeQ)))
                break:
        if(!p II (blocks != sp->blocks))
                if(bh->wantPtr < bh->wantLimit)
                    *bh->wantPtr++ = blocks;
        if(!p)
            return(0);
        cp = (ChunkPrefixPtr) (p - sizeof (ChunkPrefix));
        if(cp->magic != McSorted) [
                DebugNumberMessage("BuffaloLasso: not sorted",
        cp->magic);
            return(0);
    }
            if(++sp->inUse > sp->maxUsed)
                    sp->maxUsed = sp->inUse;
            cp->throwback = throwback;
            cp->magic = McAllocated;
            return(p);
}
```

Figure 5:
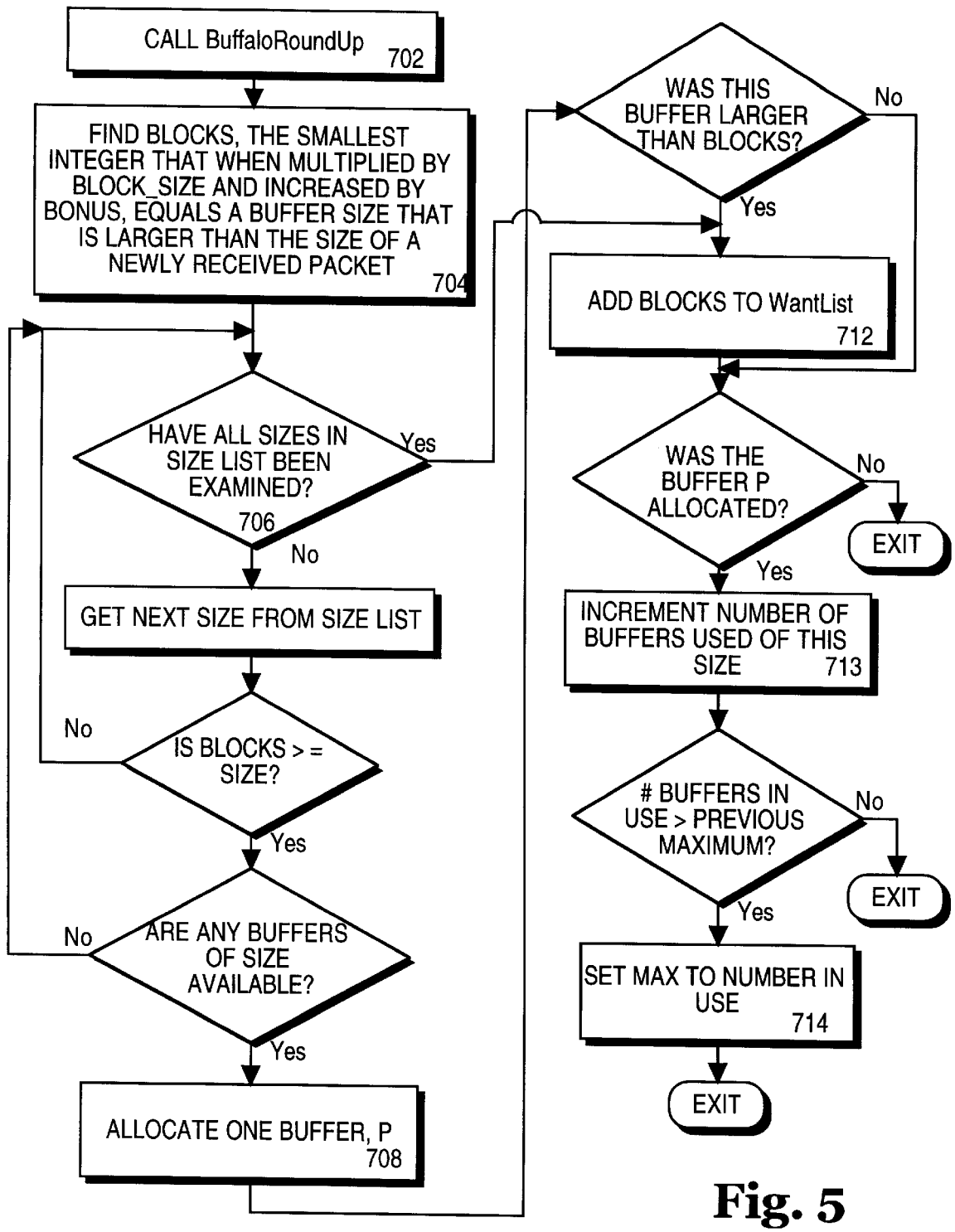
FIG. 5 shows a flowchart representation of the process Buffalo Lasso, according to one embodiment of the present invention.

The process of BuffaloLasso is further described in FIG. 5.

BuffaloLasso returns the address of a buffer where a newly received packet may be stored 708. If no such buffer is available, the BuffaloLasso returns a zero.

If a call to BuffaloLasso does not return a buffer (i.e., returns a zero), either because all the allocated buffers of that length or larger are full. BuffaloCensus maintains a "Want List" of packet sizes that are not currently available in memory, but which have been "requested" by the network or by applications. The Want List includes buffer sizes corresponding to packets that have been discarded.

BuffaloCensus begins by seeking to move an entry from the wantList by allocating a buffer 801, 803. The entry in the wantList contains a desired buffer size; the buffer size being a size for which no buffer was available. In an outer loop, 802, BuffaloCensus sets BLOCKS to the given buffer size from the wantList (and of LEN, which is not used immediately) 804 and then begins an inner loop 806, searching through the sizeList for a buffer that is equal to the size of the wantList entry BLOCKS.

If a sizeList entry has not been found equal to size BLOCKS, then a new sizeList entry is allocated, and added to the sizeList 814. Then, reduceTime is initialized to 5 seconds 815. A value FAKE, initialized at the beginning of BuffaloCensus to zero, is compared to BLOCKS 817. If FAKE is not equal to BLOCKS, compute a new size equal to (BLOCKS~EXTRA_PERCENT+50)/100 and add an entry of that size to the wantList 819, and set FAKE equal to BLOCKS 821 so that on a subsequent pass these steps 817, 819 will not be repeated for the block size.

Two values, totalBufs and MaxUsed, are subtracted, and the difference compared to New_Max 823. If the difference exceeds New_Max, then the outer loop is repeated for the next entry in the wantList. If the difference is no greater than New_Max, however, then BuffaloCensus attempts to allocate one buffer of size LEN. Size LEN is determined at the beginning of buffaloCensus, as a value depending on BLOCKS. If an buffer can be allocated, then the buffer is added to the freeQ 825 and the total number of buffers is incremented 827, and BuffaloCensus loops back to the next entry in the wantList 801.

If the buffer could be allocated, or there are no remaining entries in the wantList, then BuffaloCensus proceeds to step 829. A second loop begins, for each entry in the sizeList 831. WANT is computed to be (MaxUsed* Want_Percent+50)/100, as a parameter; len is also computed 831. If the number of total Buffers is not less than WANT, then the process branches to step 835. At step 835, the time is compared to reduceTime, a parameter that ensures periodic testing of the buffer quantities. If the total number of buffers is less than WANT, and we can allocate a buffer of size LEN, we do so 833. If the buffer is allocated, add it to the freeQ, increment total buffers, and go back to compare the total buffers to WANT at step 887. If the reduceTime is not yet run out, then the process branches back to sep 829. If the total number of buffers is greater than to WANT, then the process branches to step 837. Thus, at step 837, the reduceTime has arrived. The total buffers is compared to WANT, and if the total buffer is greater than WANT and at least one buffer is available, then one buffer is released 841, and total buffers is decreased by one 843, and total buffers is compared to zero 845. If total buffers is equal to zero, then the sizeList entry is released for the size of 18 BLOCKS 847. If total buffers is not equal to zero, then total buffers, less WANT, is compared to New_Max 849. If the difference is greater than New_Max, then the process sets the reduceTime to ⅓ of a second because a large number of excess buffers has been identified; it is much larger than New_Max, which the ideal number of excess buffers. If the difference is not greater than New_Max, and the difference is one (i.e., we have only one buffer of the size remaining) then we set the reduce time to 6 seconds, to hang on to the last one for a longer period of time. Otherwise (i.e., total buffers is not one but the number is not excessive) then reduceTime is set to one second 871. From all of these situations, go back to see if there are any more entries on the sizeList.

However, if the inner loop terminates, then some intermediate values are determined 818. An entry for the sizeList is created of the block size, and a new "FAKE" entry is added to the wantList that is somewhat larger than the actual size wanted. Thus, when enough packets of a given length have been received to justify beginning to use buffers of that length, the buffer is allocated. BuffaloCensus then makes a determination as to whether the memory pool corresponding to the application has enough adjacent memory to begin allocating buffers of that length.

In a second outer loop, at step 852, BuffaloCensus begins iterating through the sizeList. BuffaloCensus examines the sizeList for particular allocated buffers that have been vacant for a particular time interval, and for buffer sizes that are allocated but for which no packet has been received for a particular time interval. The time period considered is "reduceTime." The embodiment of the present invention allocates at least 50% more buffers of a particular size than are actually being used, or have been in used over the last brief period of time, in case some bursty data arrives in the immediate future. At step 854, "WANT" is calculated to ensure that the additional buffers remain allocated. If fewer than this number are currently allocated, then more are needed; the call to NewPtr and Birth at step 856 provides an additional buffer, and the counter totalBuff is incremented. BuffaloCensus then considers deallocating buffers. This is risky, in that buffers may be needed that are not allocated, requiring allocation of still larger buffers. If the number of buffers totalBuf is greater than WANT, then too many buffers have been allocated and one is deallocated 858. Only one is deallocated, though; precipitous deallocation of buffers may lead to insufficient buffers being available when a burst of data arrives. The call to Slaughter at step 858 deallocates the buffer.

Finally, BuffaloCensus reevaluates the time interval. If a large number of buffers have been identified for deallocation 870, then the time interval is reduced to ⅓ of a second. If, however, only one buffer of a given size remains. then the time interval is increased to 6 seconds 872. Otherwise, the time interval is one second 874.

BuffaloCensus may be implemented by the following code:

```
BuffaloCensus(
    BuffaloHeadPtr         bh
){
    SizePlacePtr    osp, sp, nsp;
    Ptr             p;
    int             len, blocks, want, fake;
    long            now;
    now = TickCount ();
    fake = 0;
    bh->takingCensus = true;
    while (bh->wantPtr > bh->wantBuf) {
        blocks = *--bh->wantPtr;
        len = blocks * BLOCK_SIZE + bh->bonus;
        for (osp = 0, sp = bh->sizeList; sp; osp = sp, sp = sp->next)
            if(blocks <= sp->blocks)
                break;
        if(sp II blocks != sp ->blocks) & if (!(nsp = (sizePlacePtr)
            NewPtrClear(Sizeof(SizePlace))))
                breakl
```

```
            nsp->blocks = blocks;
            nsp->reduceTime = now + 5*SEC;
            nsp->next = sp;
            if(osp)
                osp->next = nsp;
            else
                bh->sizeList = nsp;
            sp = nsp;
            if(blocks != fake)
                *bh->wantPtr++ = fake = (blocks *
EXTRA_PERCENT + 50) / 100;
        }
        if((sp->totalBufs - sp->maxUsed) > NEW_MAX)
            continue;
    if(p = NewPtr(len)) {
        Birth(sp, p, len);
        sp->totalBufs++;
    }else
        break;
    }
    for(osp = 0, sp = bh->sizeList; sp, osp = sp, sp = nsp) {
        nsp = sp->next;
        want = (sp->maxUsed * WANT_PERCENT + 50)/100;
        len = sp->blocks * BLOCK_SIZE + bh->bonus;
        while((sp->totalBufs < want) && (p =
NewPtr(len))){
            Birth(sp, p, len);
            sp->totalBufs++;
        }
        if(now >sp->reduceTime) {
            if((sp->totalBufs > want) && (p =
Popqueue(&sp->freeQ))){
                sp->totalBufs--;
                Slaughter(p);
            }
            if(sp->totalBufs) {
                sp->maxUsed = sp->inUse;
                if((sp->totalBufs - want) > NEW_MAX)
                    sp->reduceTime = SEC/3;
                else if (sp->totalBufs == 1)
                    sp->reduceTime = 6*SEC
                else
                    sp->reduceTime = 1*SEC:
                sp>reduceTime += now;
            }else{
                if(osp)
                    osp->next = nsp;
                else
                    bh->sizeList= nsp;
                DisposePtr((Ptr) sp);
                sp = osp;
            }
        }
    }
    bh->takingCensus= false;
}
```

Figure 6:
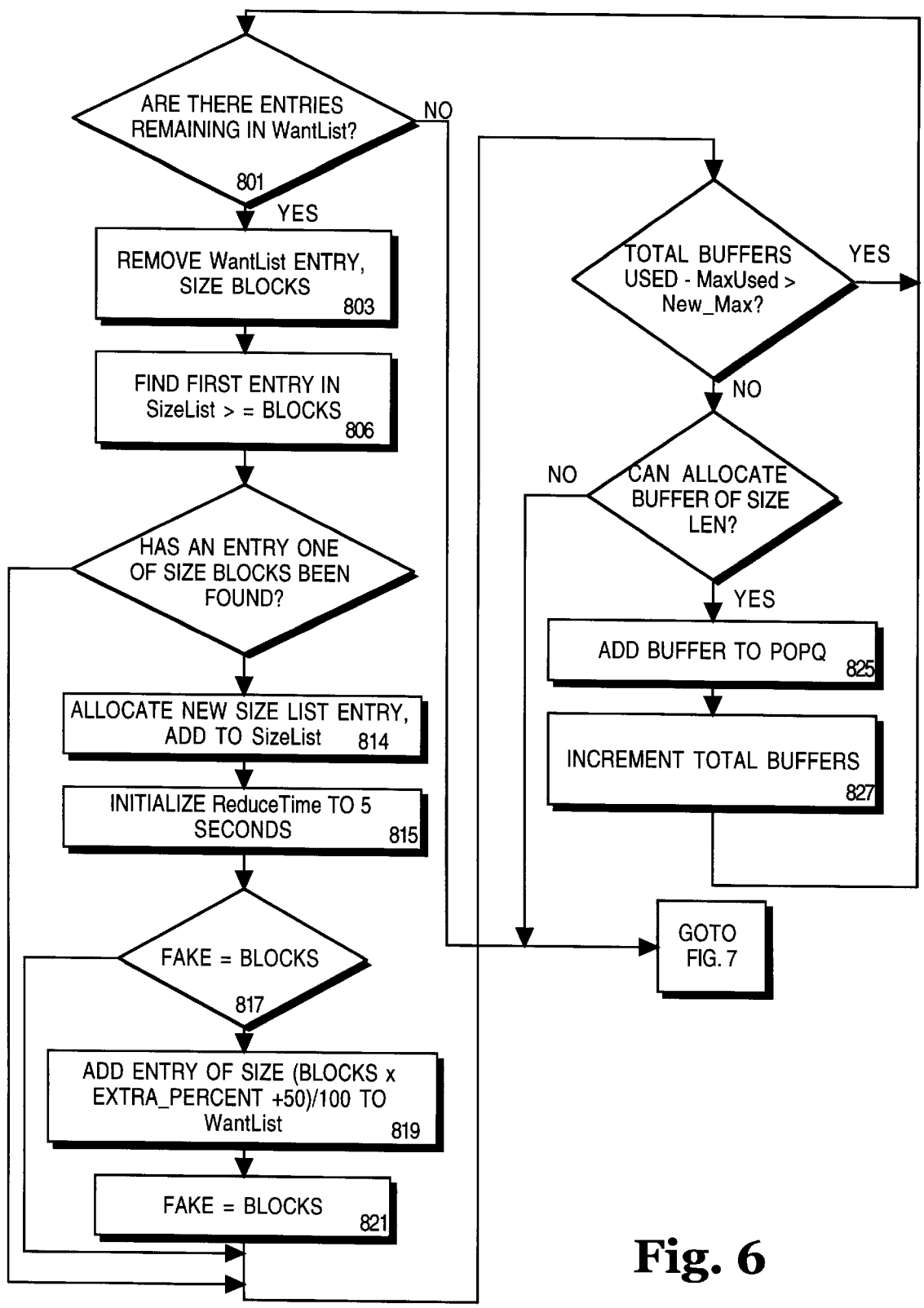
FIGS. 6 and 7 show a flowchart representation of the process Buffalo Census, according to one embodiment of the present invention.
Figure 7:
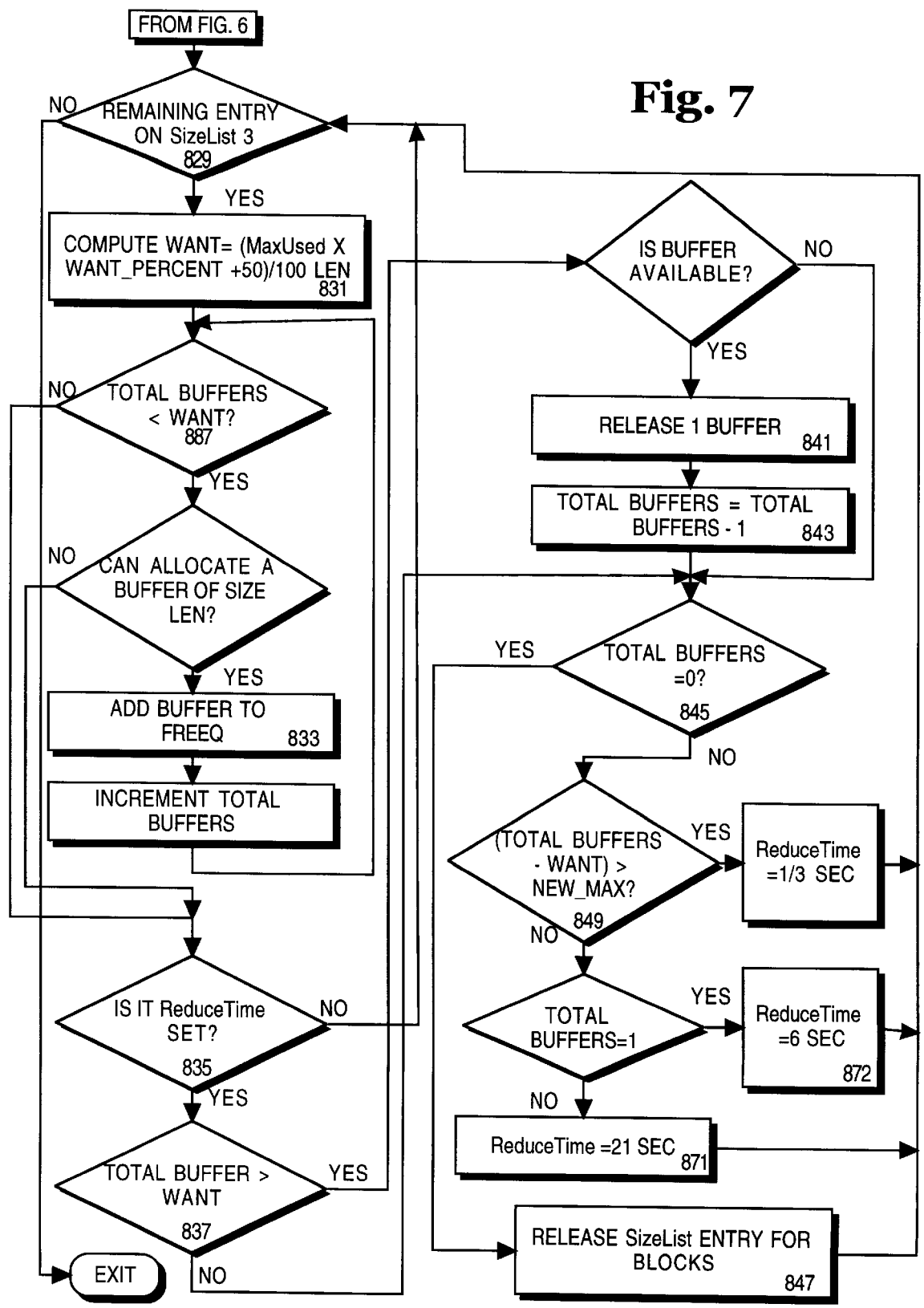

The process of BuffaloCensus is further described in FIG. 6 and FIG. 7.

As shown in the above code detailing BuffaloGetOneChunk, a subsequent BuffaloLasso call stores the packet if BuffaloCensus finds sufficient memory.

When requesting a buffer length, BufaloCensus also requests a buffer length that is somewhat larger than the buffer length needed. For example, if a buffer of 3 blocks (BLOCKS=3) is requested, (that is, buffer size, in bytes, =3 *blocks_size+bonus), then a second "FAKE" buffer is also requested that is somewhat larger. Allocated buffers are placed in the freeQ queue by Enqueue, and the amount of time other sizes have been listed in the queue is considered; sizes that have not been requested for a predetermined amount of time, or that have not been requested with sufficient frequency, are removed from the freeQ list, while other sizes not listed in freeQ can be placed there if a sufficient number of requests are made within a predetermined amount of time. In other words, if an application requests a buffer of size three, or if a package that would fit into a buffer of size three is discarded, in addition to requesting a buffer of size three, and "extra percent" equals 140, then BuffaloCensus makes an additional request for a buffer 47% larger than the buffer actually requested. This, however, is rounded up to the next whole number of buffers.

BuffaloLasso, called by BuffaloGetOneChunk (described above) allocates a buffer of a familiar size to the I/O system. BuffaloLasso is called when a packet is received. The first few bytes of each buffer comprise a "chunk prefix" field that indicates whether the buffer has been handled improperly due to programming errors in an application that calls the process embodiment of the present invention. If an application receiving information via a real time teleconference network using the described embodiment of the present invention has been programmed incorrectly, such may be indicated in chunk prefix. Common programming errors include overriding memory, releasing memory twice, allocating to a buffer a memory location already being used in an allocated buffer, or attempting to use a buffer that has already been released to the memory manager.

BuffaloLasso also calls BuffaloRoundup, a routine that sorts through memory identifying buffers that have been recently freed. One implementation of BuffaloRoundup is according to the following code;

```
BuffaloRoundup (
    BuffaloHeadPtr            bh
){
    SizePlacePtr              sp:
    ChunkPrefixPtr            cp:
    Ptr                       p;
        while (p = Popqueue(&bh->freeQ)) {
            cp = (ChunkPrefixPtr) (p - sizeof (ChunkPrefix));
            for (sp = bh->sizeList; sp; sp = sp->next)
                if (if sp->blocks == cp->blocks)
                    break;
            if (cp->magic != McReleased)
            DebugNumberMessage ("BuffaloRoundup:
not released", cp- >magic);
            else if(sp) {
                sp->magic =McSorted;
                Enqueue((QElemPtr) p, &sp->freeQ);
                sp->inuse--;
            }else
                    DebugNumber message( "BuffaloRound up:
bad block size", cp- >blocks);
        }
}
        void
```

BuffaloRoundup pops the freeQ, arranges the entries into increasing order, and checks for errors. BuffaloRoundup then re-pushes the entries into the queue, thus establishing the order of the entries in the queue. BuffaloRoundup also generates the list of buffer sizes currently allocated. For example, a "three" in the list generated by BuffaloRoundup indicates that buffer sizes of (3×BLOCK-SIZE+Bonus) bytes in length. The list is itself sorted so that the numbers are in increasing order. Popqueue, enqueue, and freeQ maintain the list of buffers, and provide error checking. After calling BuffaloRoundup, BuffaloLasso computes a minimum buffer size that will hold a newly received packet (i.e., by rounding up to the next multiple of the block size and adding the bonus), and then iterates through the list of buffer sizes sorted by BuffaloRoundup until a buffer size large enough to accommodate the newly received packet is found. BuffaloLasso returns zero if no buffer is found which will accommodate the newly received packet. BuffaloLasso also records the number of buffers of each side currently in use, and the maximum number of buffers of each particular size that have been used since BuffaloCensus was last called.

It may be, however, that the entire memory which the present invention can allocate to an application is full. In such a case, of course, BuffaloGetOneChunk does not allocate any memory or store the packet. In some embodiments, however, the size may nevertheless be stored in the Want List.

The Want List and the Size List both have timing constraints that remove entries after a predetermined amounts of time has elapsed and certain conditions are met. Entries are removed from the Want List. Entries are removed from the Size List when a certain amount of time has elapsed in which no packet appropriate to a particular buffer size has been received and stored, and no requests for packets of that length have been received from teleconferencing or other I/O applications. BuffaloPutOneChunk deallocates buffers allocated by BuffaloGetOneChunk, returning the corresponding buffer for reuse.

In rare instances, the entire supply of main memory for the entire application, is in short supply. In such instances, the present invention surrenders memory for non- teleconferencing uses, and simply updates the teleconference video less frequently by storing fewer buffers. The described embodiment of the present invention accomplishes this by including a GrowZoneProc that may be called by the system when, at an application level, there is insufficient memory to service memory requests. Because the buffers corresponding to real time teleconference networking have such a low priority in that occasional data can be discarded without disrupting the teleconference, the GrowZoneProc of the present invention begins deallocating buffers from memory corresponding to the I/O system, retaining one of each size, allowing memory to be used by other applications. One embodiment of the GrowZoneProc is implemented by the following code:

```
BuffaloSetGrowZoneProc (
    GlobalsHandle    gh,
    BuffaloGZProcPtr proc,
    long             refcon
){
    GlobalsPtr   gp = *gh;
    gp->gzProc = proc;
    gp->gzRefcon = refcon;
}
    pascal long
    BuffaloGrowZone(
    Size         cbNeeded,
    ProcessStuffPtr  ps
){
    long     size
    GlobalsPtr  gp:
if(size = BuffaloTwilightZone(ps->buffalo, cbNeeded))
    return(size > 0 ? size: 0);
    for(gp = (GlobalsPtr) ps->instances.qHead;gp; gp =
    (GlobalsPtr) gp->qLink)
    if(gp->gzProc && (size = (*gp->gzProc) (gp-
        >gzRefcon, cbNeeded)))
            return(size);
    return(0);
}
BuffaloTwilightZone(
    BuffaloHeadPtr         bh,
    Size   /* needed */
){
    SizePlacePtr sp;
    Ptr        p;
    Size       found;
    if(bh->takingCensus)
        return(-1);
```

```
    BuffaloRoundup (bh);
    found = 0;
    for (sp = bh->sizeList; sp; sp = sp->next)
        if((sp->freeQ.qHead != sp->freeQ.qTail) && (p =
    Popqueue(&sp->freeQ))){
            found += GetPtrSize (p - sizeof (ChunkPrefix));
    sp->totalBufs--;
    Slaughter (p);
    }
    return(found);
}
    Ptr
Popqueue(
    QHdrPtr      qp
)}
    QElemPtr    qe;
    while(qe+qp->qHead)
    if(Dequeue(qe, qp) == noErr)
        break;
    return((Ptr) qe);
}
```

In the described embodiment, additional routines are necessary to initialize the process. For example, BuffaloStart maintains a list of requests from client processes running on the receiver system that have made requests for input data received via the protocol of the present invention.

BuffaloKill, a routine called when the system is shutting down, disposes of memory. BuffaloKill may be implemented by the following code:

```
BuffaloKill(
    BuffaloHeadPtr  bh
){
    SizePlaceptr sp;
    Ptr    p;
    while(sp = bh->sizeList) {
        while(p = Popqueue(&sp->freeQ))
            Slaughter (p);
        bh->sizeList = sp->next;
        DisposePtr((Ptr) sp);
    }
    DisposePtr (bh->wantBuf);
    Dispose Ptr((Ptr) bh);
}
    static void
Slaughter (
    Ptr      p
){          cp:
    cp; cp = (ChunkPrefixPtr) (p -= sizeof(ChunkPrefix));
    if(cp->magic == McSorted) {
        (cp->magic = McDisposed;
        UnholdMemory (p, GetPtrSize(p));
        DisposePtr(p);
    }else
DebugNumberMessage ("BuffaloKill: not sorted",
cp->magic);
}
```

The present invention, in the described embodiment, also includes a routine called BuffaloRelease. BuffaloRelease is called by BuffaloPutOneChunk, and makes sure that the buffer is released, and that it appears in the in queue list freeQ. When embodiment of BuffaloRelease, in the described embodiment, is shown in the following implementation:

```
BuffaloRelease (
    BuffaloHeadPtr Ptr bh,
    Ptr p
){
```

-continued

```
        ChunkPrefixPtr cp:
cp = (ChunkPrefixPtr) (p - sizeof (ChunkPrefix));
if(!p)
                DebugMessage("BuffaloRelease: zero");
                else i f(cp->magic == McAllocated){
                cp->magic = McReleased;
                        Enqueue((QElemPtr) p, &bh->freeQ);
}else
allocated", cp->magic);
}
Birth (
        SizePlacePtr sp,
        Ptr p,
        int len
){
ChunkPrefixPtr cp:
                cp = (ChunkPrefixPtr) p;
                cp->magic = McSorted;
cp->blocks = sp->blocks;
HoldMemory (p, len);
                Enqueue ( (QElemPtr) (p + sizeof(Chunkprefix)), &sp->freeQ);
}
BUUFFALOPUTONECHUNK
BuffaloInit also establishes periodic calls to BuffaloIdle as shown in the
following code:
_BuffaloInit(
        GlobalsHandle gh,
        long bonus
)}
GlobalsPtr gp + *gh;
ProcessStuffPtr ps;
ps = gp->process;
                if(ps->buffalo)
                        gp->bonus = bonus - ps->bonus;
                else{
                        if(!(ps->buffalo = BuffaloStart (ps->bonus = bonus)))
                        return(MemError());
                if(!(ps->cabbage = OpenDefaultComponent
                        (kMTIdlerType, kMTMovieTalkSubType)))
                        return(cantOpenHandler);
                        MTIdlerGimmeTime (ps->cabbage, 16, BuffaloIdle,
                        (long) ps);
}
                return(noErr);
}
static pascal void
BuffaloIdle (
long refcon
){
ProcessStuffPtr ps = (GlobalsPtr) refcon:
BuffaloCensus(ps->buffalo);
}
```

BuffaloInit therefore establishes periodic calls to BuffaloCensus, organizing the structure of the buffer list. More frequent calls to BuffaloCensus allows better use of the buffer allocation, but slows down the process. BuffaloCensus includes a variable "taking Census" that is set to "TRUE" while the routine is sorting and reallocating memory. The variable prevents calls to GrowZoneProc while the census is being taken, merely refraining from reallocating memory while memory is scarce. This, coupled with the automatic time-out feature deallocating memory buffers that have not been used with sufficient memory, allow a streamlined use of memory.

Figure 8:
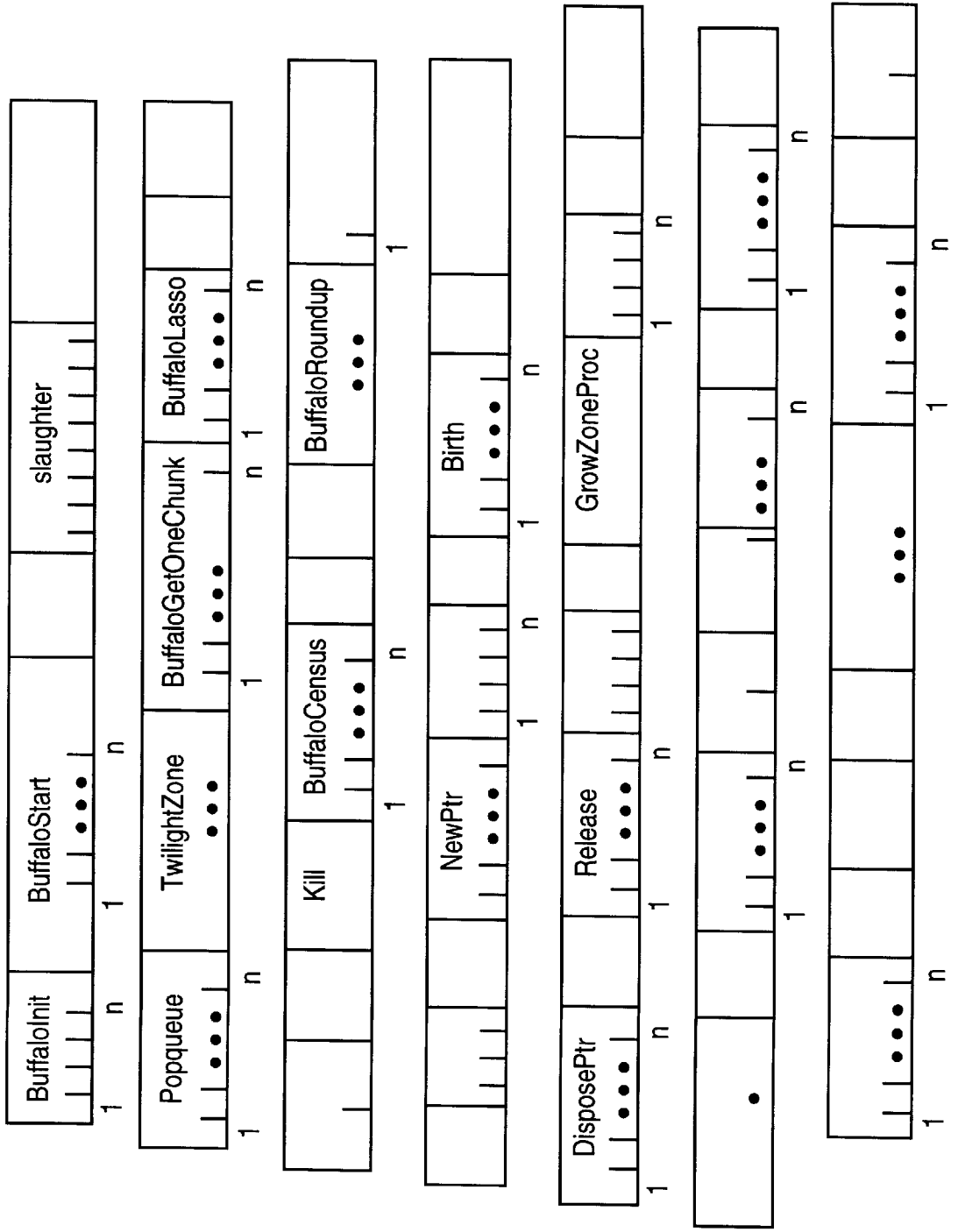
FIG. 8 shows an example of a memory containing programmed instructions in memory locations.

The code set forth above in the description of one embodiment of the present invention can be stored in a main memory, a read only memory, or a mass storage device, or in other external storage devices such as magnetic discs or other magnetic media. FIG. 8 shows such an embodiment of a memory containing a set of program instruction that, when executed by a processor of a computer system, performs steps according to one embodiment of the present invention. It will be apparent that other means for storing programs are available, and that some systems provide several different sources of stored programs to the same processor. For example, application-level programs may be stored in main-memory or on a magnetic disc, while lower layer programs may be stored in a special cache or in ROM.

In addition to the above, various embodiments of the present invention allow a system user to define tunable parameters, allowing the user to personalize various features. Such tunable parameters include, in the above described embodiment for example: Num_Want_Entries, Block_Size, Want_Percent, Extra_Percent, and New_Max. Num_Want_Entries sets a maximum number of entries in the wantList. A region in memory to hold the wantList is allocated in BuffaloStart, using the Num_Want_Entries parameter. Block_Size determines the incremental size difference between buffer sizes; each buffer is of a length, measured in bytes, of a multiple of Block_Size, plus the Bonus. Want_Percent, used in the second part of BuffalCensus, provides some assurance that, when buffers of a given size have been used over the period of time defined by reduceTime, then at least that many, plus some additional buffers, remain allocated to receive data. Extra_Percent is used in BuffaloCensus, set forth above. Extra_Percent, used in the first part of BuffaloCensus, allows a second, larger buffer to be requested whenever a buffer is added to the wantList. New_Max, used in BuffaloCensus, allows a user to decide how many empty buffers of a given size to allow remain empty for as long as the reduceTime, before deallocating a buffer.

Although the present invention will be understood more fully from the detailed description given above and from the accompanying drawings of various embodiments of the invention, the description and drawings should not be taken to limit the invention to the specific embodiments, but are for explanation and understanding only. It will be apparent to one of ordinary skill in the art that the present invention may be practiced without these specific details.

I claim:

1. A method comprising:

heuristically determining a plurality of buffer sizes corresponding to packet sizes expected to be received;

preallocating at least one buffer of each size to be available for an incoming packet of less than or equal to that size;

periodically determining if a particular buffer size has not been used for a time period;

deallocating at least one buffer of that particular buffer size if no buffer of that size has been used for the time period; and reviewing discarded packet sizes to identify additional buffer sizes to be allocated wherein said discarded packets have packet sizes larger than the preallocated buffer sizes and the discarded packets cannot be stored in the preallocated buffers; and preallocating buffers of the additionai sizes.

2. The method of claim 1 further comprising:

receiving a packet from a communication medium;

seeking a smallest preallocated buffer that will accommodate the packet received; and storing the packet in the smallest preallocated buffer that will accommodate the packet if one exists.

3. The method of claim 2 further comprising:

adding a buffer size to a list of additional buffer sizes to be preallocated if the smallest preallocated buffer that would accommodate the packet is larger than the smallest integer multiple of block sizes that would accommodate the packet.

4. The method of claim 2 wherein seeking comprises:

iterating through a list of preallocated buffer sizes until a buffer of size greater than the packet size is found or an end of the list is reached.

5. An apparatus comprising:

means for heuristically determining a plurality of buffer sizes corresponding to packet sizes expected to be received;

means for preallocating at least one buffer of each size to be available for an incoming packet of less than or equal to that size;

means for periodically determining if a particular buffer size has not been used for a time period;

means for reviewing discarded packet sizes to determine additional buffer sizes to be preallocated wherein said discarded packet sizes being larger than any preallocated buffer size and the discarded packets not storable in the preallocated buffers; and means for deallocating at least one buffer of that particular buffer size if no buffer of that size has been used for the time period.

6. The apparatus of claim 5 further comprising:

means for receiving a packet from a communication medium;

means for seeking a smallest preallocated buffer that will accommodate the packet received; and means for storing the packet in the smallest preallocated buffer that will accommodate the packet if one exists.

7. The apparatus of claim 6 further comprising:

means for adding a buffer size to a list of additional buffer sizes to be preallocated if the smallest preallocated buffer that would accommodate the packet is larger than the smallest integer multiple of block sizes that would accommodate the packet.

8. A computer readable storage media containing executable computer program instructions which when executed cause a digital processing system to perform a method comprising:

heuristically determining a plurality of buffer sizes corresponding to packet sizes expected to be received;

preallocating at least one buffer of each size to be available for an incoming packet of less than or equal to that size;

reviewing a size of a discarded packet to identify additional buffer sizes to be allocated, wherein the size of said discarded packet is larger than any preallocated buffer and the discarded packet can not be stored in the preallocated buffer;

periodically determining if a particular buffer size has not been used for a time period; and deallocating at least one buffer of that particular buffer size if no buffer of that size has been used for the time period.

9. The computer readable storage media of claim 8 which when executed cause a digital processing system to perform a method further comprising:

receiving a packet from a communication medium;

seeking a smallest preallocated buffer that will accommodate the packet received; and storing the packet in the smallest preallocated buffer that will accommodate the packet if one exists.

10. The computer readable storage media of claim 8 which when executed cause a digital processing system to perform a method further comprising:

adding a buffer size to a list of additional buffer sizes to be preallocated if the smallest preallocated buffer that would accommodate the packet is larger than the smallest integer multiple of block sizes that would accommodate the packet.

* * * * *